US008834258B2

(12) United States Patent
Gobe et al.

(10) Patent No.: US 8,834,258 B2
(45) Date of Patent: Sep. 16, 2014

(54) WAGERING GAME WITH GAME ENHANCEMENT WINDOW

(71) Applicant: WMS Gaming Inc., Waukegan, IL (US)

(72) Inventors: Alexander J. Gobe, Chicago, IL (US); Daniel P. Louie, Chicago, IL (US); David M. Pryor, Elmhurst, IL (US); Jamie W. Vann, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 41 days.

(21) Appl. No.: 13/790,861

(22) Filed: Mar. 8, 2013

(65) Prior Publication Data

US 2014/0018147 A1 Jan. 16, 2014

Related U.S. Application Data

(60) Provisional application No. 61/671,413, filed on Jul. 13, 2012.

(51) Int. Cl.

*A63F 9/24* (2006.01)
*A63F 13/00* (2014.01)
*G07F 17/34* (2006.01)
*G07F 17/32* (2006.01)

(52) U.S. Cl.

CPC ............ *G07F 17/34* (2013.01); *G07F 17/3265* (2013.01)
USPC ................... 463/20; 463/16; 463/25; 463/31; 273/138.1; 273/138.2; 273/143 R

(58) Field of Classification Search

USPC ............ 463/16, 20, 25, 31; 273/138.1, 138.2, 273/143 R
See application file for complete search history.

(56) References Cited

U.S. PATENT DOCUMENTS

| | | | |
|---|---|---|---|
| 5,833,537 | A | 11/1998 | Barrie |
| 6,056,642 | A | 5/2000 | Bennett |
| 6,089,977 | A | 7/2000 | Bennett |
| 6,190,254 | B1 | 2/2001 | Bennett |
| 6,251,913 | B1 | 6/2001 | Bird |
| 6,270,411 | B1 | 8/2001 | Gura et al. |

(Continued)

OTHER PUBLICATIONS

"Playboy Hot Zone" by Bally Technologies; Strictly Slots magazine; p. 34, (dated Jul. 2011).

(Continued)

*Primary Examiner* — William Brewster
*Assistant Examiner* — Ryan Hsu
(74) *Attorney, Agent, or Firm* — Nixon Peabody LLP

(57) ABSTRACT

A gaming system includes instructions that cause the gaming system to receive an input indicative of a wager, display a plurality of reels defining a symbol array, and display a symbol-alteration region including at least two symbol positions and extending through a subset of the symbol array at a predefined position. The plurality of reels includes a plurality of symbols moving through the symbol array. The plurality of symbols includes a special symbol that has a first function for evaluating a game outcome. The symbol-alteration region is positioned such that at least some of the symbols move between a first position outside the symbol-alteration region and a second position within the symbol-alteration region. The instructions further cause the gaming system to, in response to the special symbol stopping within the symbol-alteration region, alter a functionality of the special symbol to include a second function for evaluating the game outcome.

28 Claims, 8 Drawing Sheets

(56) References Cited

U.S. PATENT DOCUMENTS

| | | | | |
|---|---|---|---|---|
| 6,290,600 | B1 | 9/2001 | Glasson | |
| 6,375,570 | B1 | 4/2002 | Poole | |
| 6,439,993 | B1 | 8/2002 | O'Halloran | |
| 6,517,432 | B1 | 2/2003 | Jaffe | |
| 6,561,900 | B1 | 5/2003 | Baerlocher et al. | |
| 6,565,433 | B1 | 5/2003 | Baerlocher et al. | |
| 6,731,313 | B1 | 5/2004 | Kaminkow | |
| 6,780,109 | B2 | 8/2004 | Kaminkow | |
| 6,805,349 | B2 | 10/2004 | Baerlocher et al. | |
| 6,866,583 | B2 | 3/2005 | Glavich et al. | |
| 6,905,406 | B2 | 6/2005 | Kaminkow et al. | |
| 6,918,832 | B2 | 7/2005 | Baerlocher et al. | |
| 6,921,335 | B2 | 7/2005 | Rodgers et al. | |
| 6,981,635 | B1 | 1/2006 | Hughs-Baird et al. | |
| 6,997,808 | B2 | 2/2006 | Rodgers et al. | |
| 7,137,888 | B2 | 11/2006 | Glavich et al. | |
| 7,195,559 | B2 | 3/2007 | Gilmore et al. | |
| 7,237,775 | B2 * | 7/2007 | Thomas et al. | 273/143 R |
| 7,252,592 | B2 | 8/2007 | Rodgers et al. | |
| 7,654,895 | B2 | 2/2010 | Pacey | |
| 7,704,141 | B1 | 4/2010 | Marks et al. | |
| 8,105,145 | B2 | 1/2012 | Jaffe | |
| 2004/0097279 | A1 * | 5/2004 | Gauselmann | 463/16 |
| 2004/0097280 | A1 * | 5/2004 | Gauselmann | 463/16 |
| 2004/0229679 | A1 | 11/2004 | Anderson et al. | |
| 2005/0049030 | A1 | 3/2005 | Tachikawa | |
| 2005/0054422 | A1 | 3/2005 | Rothkranz et al. | |
| 2006/0068873 | A1 | 3/2006 | Gomez | |
| 2006/0142077 | A1 * | 6/2006 | Miles et al. | 463/20 |
| 2009/0325678 | A1 * | 12/2009 | Gomez | 463/20 |
| 2010/0016061 | A1 * | 1/2010 | Gomez et al. | 463/20 |

OTHER PUBLICATIONS

"Alpha 2 Pro V22/22 Upright" 2011 Product Catalog; Bally Technologies; pp. 1 & 4 (dated 2011).

"Play Mechanics Excite Players" Your Bally Buzz; Bally Technologies; pp. 1 & 20 (dated Nov. 2010).

* cited by examiner

WAGERING GAME WITH GAME ENHANCEMENT WINDOW

CROSS-REFERENCE TO RELATED APPLICATIONS

This application claims the benefit of U.S. Provisional Patent Application 61/671,413, filed on Jul. 13, 2012, which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to a gaming system including and a method of using a game enhancement window.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

SUMMARY OF THE INVENTION

According to one aspect of the present invention, a gaming system comprises one or more input devices, one or more display devices, one or more processors, and one or more memory devices. The one or more memory devices store instructions that, when executed by at least one of the one or more processors, cause the gaming system to receive an input indicative of a wager, display a plurality of reels defining a symbol array, and display a symbol-alteration region including at least two symbol positions and extending through a subset of the symbol array at a predefined position. The input of a wager is received via at least one of the one or more input devices. The plurality of reels and the symbol-alteration region are displayed on at least one of the one or more display devices. The plurality of reels includes a plurality of symbols moving through the symbol array. The plurality of symbols includes a special symbol that has a first function for evaluating a game outcome. The symbol-alteration region is positioned such that at least some of the plurality of symbols move between a first position outside the symbol-alteration region and a second position within the symbol-alteration region. The instructions further cause the gaming system to, in response to the special symbol stopping within the symbol-alteration region, alter a functionality of the special symbol to include a second function for evaluating the game outcome.

According to another aspect of the invention, a computer-implemented method in a gaming system comprises receiving an input indicative of a wager, displaying a plurality of reels defining a symbol array, displaying a symbol-alteration region; and displaying a game outcome. The input is received via at least one of one or more input devices. The reels define a symbol array and include a plurality of symbols moving within the symbol array. The plurality of symbols includes a special symbol having a first function for evaluating the game outcome. The symbol-alteration region is located at a predefined position while the plurality of symbols are moving through the symbol array. The symbol-alteration region also overlies a first subset of the symbol array and includes at least two symbol positions within the symbol array. The game outcome includes the special symbol stopping within the symbol-alteration region and, in response to the special symbol stopping within the symbol-alteration region, altering a functionality of the special symbol to include a second function for evaluating the game outcome.

According to yet another aspect of the present invention, a gaming system comprises one or more input devices, one or more display devices, one or more processors, and one or more memory devices. The one or more memory devices store instructions that, when executed by at least one of the one or more processors, cause the gaming system to an input indicative of a wager, display a plurality of reels defining a symbol array, and display a symbol-alteration region overlying a subset of the symbol array. The wager is received via at least one of the one or more input devices. The plurality of reels includes a plurality of symbols moving within the symbol array. The plurality of symbols includes a special symbol having an original depiction and an altered depiction. The instructions further cause the gaming system to, in response to the special symbol moving between a first position outside the symbol-alteration region and a second position within the symbol-alteration region, alter the original depiction of the special symbol to the altered depiction.

According to a further aspect of the invention, a computer-implemented method in a gaming system comprises receiving an input indicative of a wager, displaying a plurality of reels defining a symbol array, displaying a symbol-alteration region extending through a subset of the symbol array, and moving a plurality of symbols through the symbol array. The input is received via at least one of one or more input devices. The displaying of the plurality of reels and the symbol-alteration region is done on at least one of one or more display devices. The plurality of reels includes the plurality of symbols. The plurality of symbols includes a special symbol having an original depiction and an altered depiction. The moving is done such that the special symbol moves between a first position outside the symbol-alteration region and a second position within the symbol-alteration region. The method further includes, response to the special symbol moving between the first position and the second position, altering, via at least one of one or more processors, the original depiction of the special symbol to the altered depiction.

According to yet another aspect of the invention, computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1:
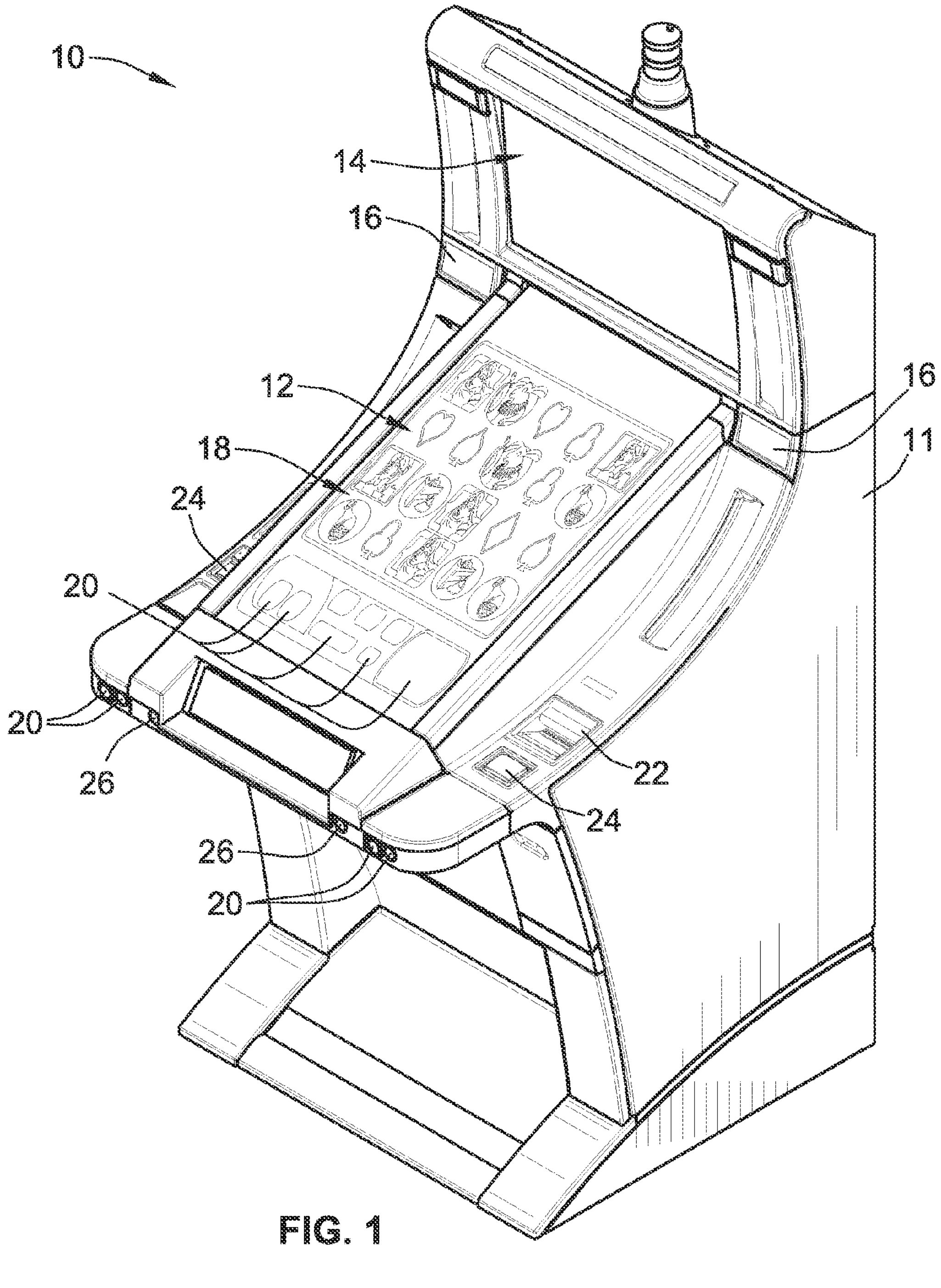
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a “Max Bet” button or soft key to indicate a player’s desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
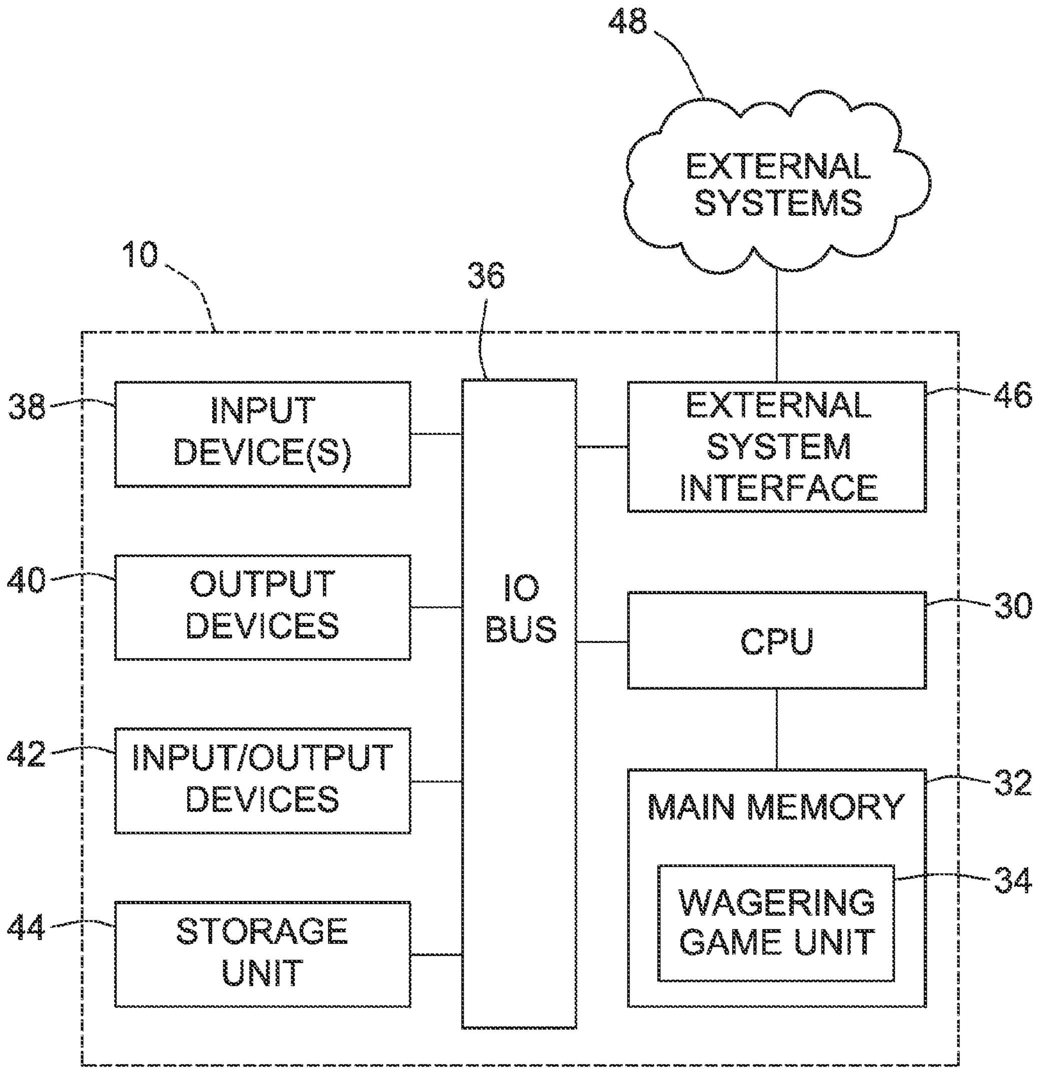
FIG. 2 (PRIOR ART)
FIG. 2 is a schematic view of a gaming system according to an embodiment of the present invention.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
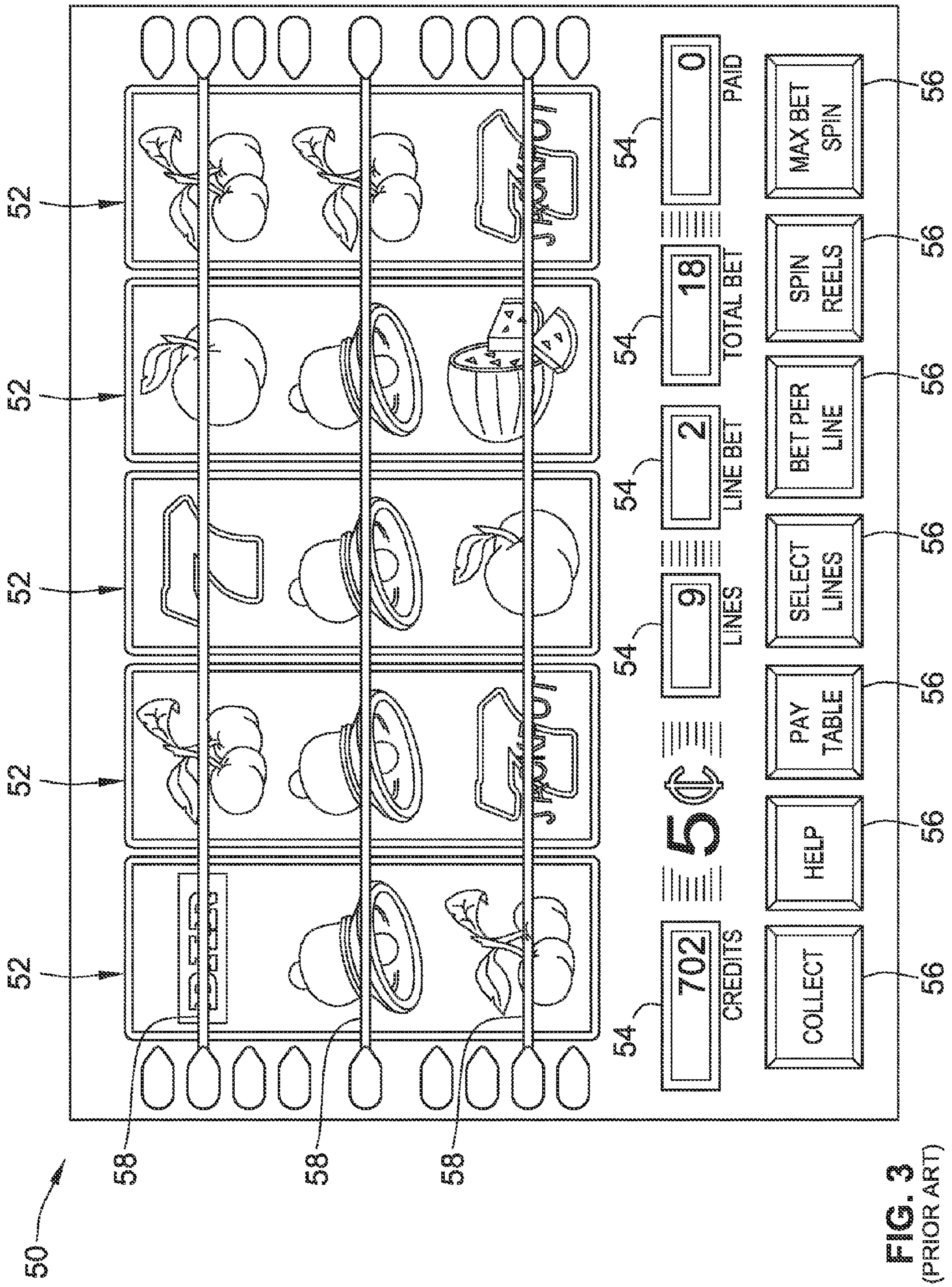
FIG. 3 (PRIOR ART)
FIG. 3 is an image of an exemplary basic-game screen of a wagering game displayed on a gaming terminal, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
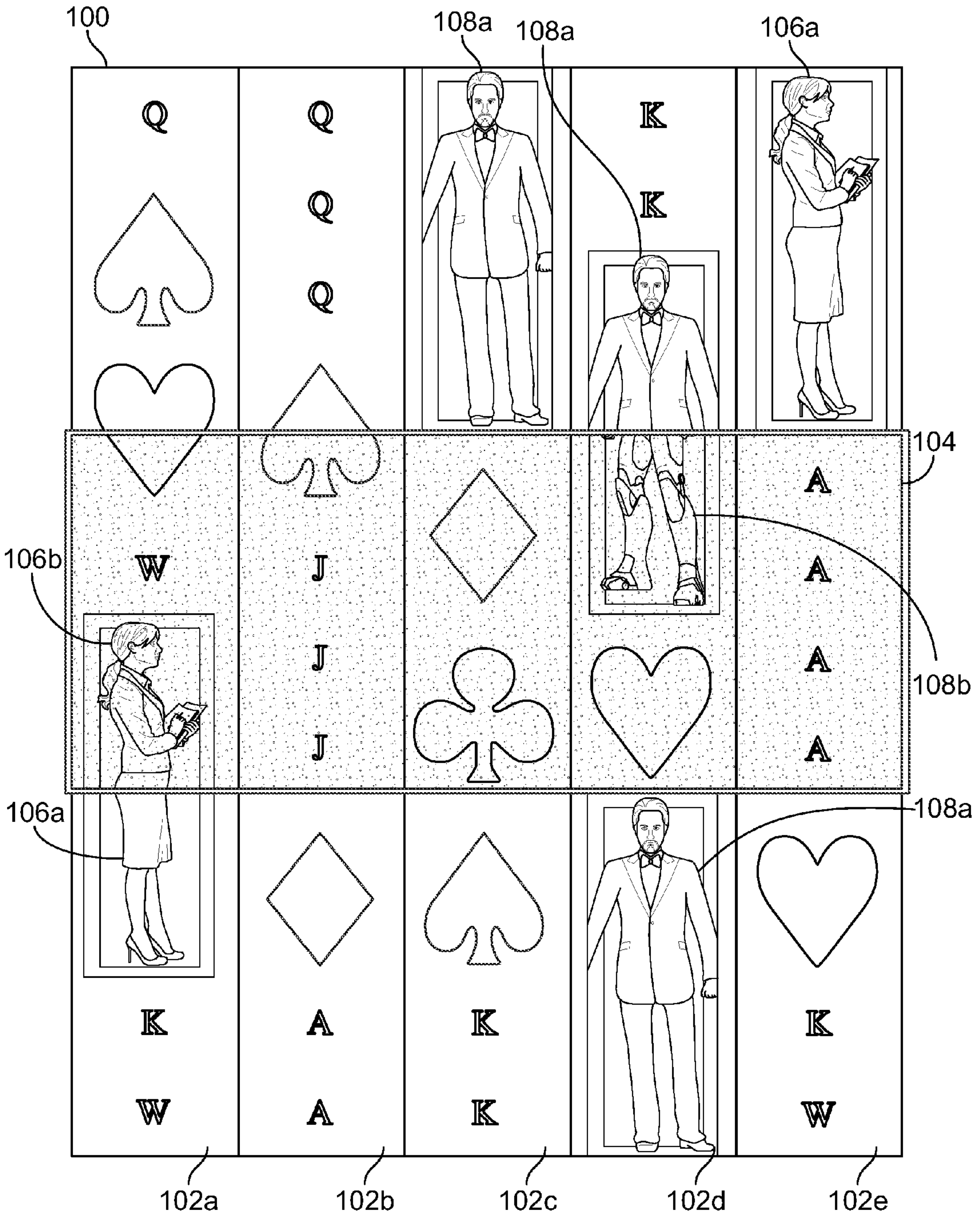
FIG. 4 is a symbol array having a plurality of reels and a symbol-alteration region shown on a primary display during an instance of the wagering game.

Referring now to FIG. 4, a symbol array 100 having a plurality of reels 102*a*-102*e* and a symbol-alteration region 104 is shown on the primary display 12. The reels 102*a*-102*e* include a plurality of symbols thereon and can be, for example, mechanical, video, or simulated mechanical reels. The symbols may be various sizes. As can be seen by the illustrated embodiment, certain symbols may occupy a single symbol position such as the "A," "K," "Q," "J," and "W" symbols of FIG. 4. Additionally, certain symbols occupy multiple adjacent positions such as the two-high "SPADE," "HEART," "DIAMOND," and "CLUB" symbols or the four-high "Character" special symbols 106, 108, which are described in more detail below. It is contemplated that all symbols in the plurality of symbols can be the same size.

The symbol array 100 also includes a symbol-alteration region 104. In the illustrated embodiment, the symbol-alteration region 104 is displayed as a shaded area overlying a subset of the symbol array 100 and covering a portion of each of reels 102*a*-102*e*. The position and/or size of the symbol-alteration region 104 are fixed or can be variable such that they are determined before the reels move, or at least before the reels stop spinning. The symbol-alteration region 104 operates to alter functions and/or depictions of special symbols in the plurality of symbols. In the illustrated embodiment, two female special symbols 106 and three male special symbols 108 are shown. The symbol-alteration region 104 alters the function of the female special symbols 106 when the symbols are within the symbol-alteration region 104 without altering their depiction. Also, the symbol-alteration region 104 alters the depiction (and functionality) of the male special symbols 108 when the symbols are within the symbol-alteration region 104.

The female special symbol 106 has variable functions, including at least a first functional state 106*a* and a second functional state 106*b*. Each functional state is associated with one or more enhancements for enhancing the wagering game. These enhancements can include, for example, free spins, win multipliers, bonus games, symbol replacement, reel nudges, a progressive jackpot, scatter pays, etc. The free-spins enhancement causes one or more of the reels 102*a*-102*e* to respin one or more times. The win-multipliers enhancement multiplies the payout of a winning combination of symbols by a given number. The bonus-games enhancement triggers play of a bonus game. The symbol-replacement enhancement randomly selects one or more symbol locations on the symbol array and assigns a symbol to the locations. The reel-nudges enhancement allows the symbols on one or more reels to be moved one or more symbol positions to, perhaps, increase an award. The progressive-jackpot awards a sum of money based on wagers placed at one or more wagering machines. The scatter-pays enhancement adds a scatter pay award to one or more types of symbol that were previously only line pay awards. It is contemplated that other enhancements may be included in the wagering game.

As an example, the first functional state 106*a* awards a free-spins enhancement and the second functional state 106*b* awards a bonus game. Two female special symbols 106 are displayed on the symbol array 100 in FIG. 4. The first female special symbol 106 is located on the rightmost reel 102*e* and has stopped outside of the symbol-alteration region 104. The second female special symbol 106 is located on the leftmost reel 102*a* and has stopped within the symbol-alteration region 104. Both the first and the second female special symbols 106 include the first functional state 106*a*. However, the symbol-alteration region 104 alters the second female special symbol 106 to also include the second functional state 106*b*. When the gaming system evaluates the game outcome, the outcome would be enhanced with free spins by the first female special symbol 106, as well as free spins and a bonus game by the second female special symbol 106. These enhancements may only be awarded if the female special symbol 106 appears on a winning payline.

The male special symbol 108 has at least two depictions, including a first depiction state 108*a* and a second depiction state 108*b*. The first depiction state 108*a* of the male special symbol 108 is a man wearing a tuxedo. The second depiction state 108*b* of the male special symbol 108 is a suit of armor. The first depiction state 108*a* is used for any part of the male symbol that is outside the symbol-alteration region 104. Any portion of the male special symbol 108 that is within the symbol-alteration region 104 is displayed as the second depiction state 108*b*. In a preferred embodiment, the male special symbol 108 also includes a first and a second functional state that is altered by the symbol-alteration region 104. In other words, the first and the second depiction states 108*a*, 108*b* are used to indicate a change in the functionality of the male special symbol 108.

Three male special symbols 108 are displayed on the symbol array 100 in FIG. 4. The first male special symbol 108 is located on the middle reel 102*c* and is entirely outside of the symbol-alteration region 104. The second male special symbol 108 is located near the top of the fourth reel 102*d* and is partially within the symbol-alteration region 104. The third male special symbol 108 is located at the bottom of the fourth reel 102*d* and entirely outside of the symbol-alteration region 104. The first and the third male special symbols display only the first depiction state 108*a* because they are entirely outside of the symbol-alteration region 104. The upper half of the second male symbol 108 on reel 102*d* is displayed in the first depiction state 108*a* because it is outside of the symbol-alteration region 104 and the lower half is displayed in the second depiction state 108*b* because it is within the symbol-alteration region 104.

Figure 5:
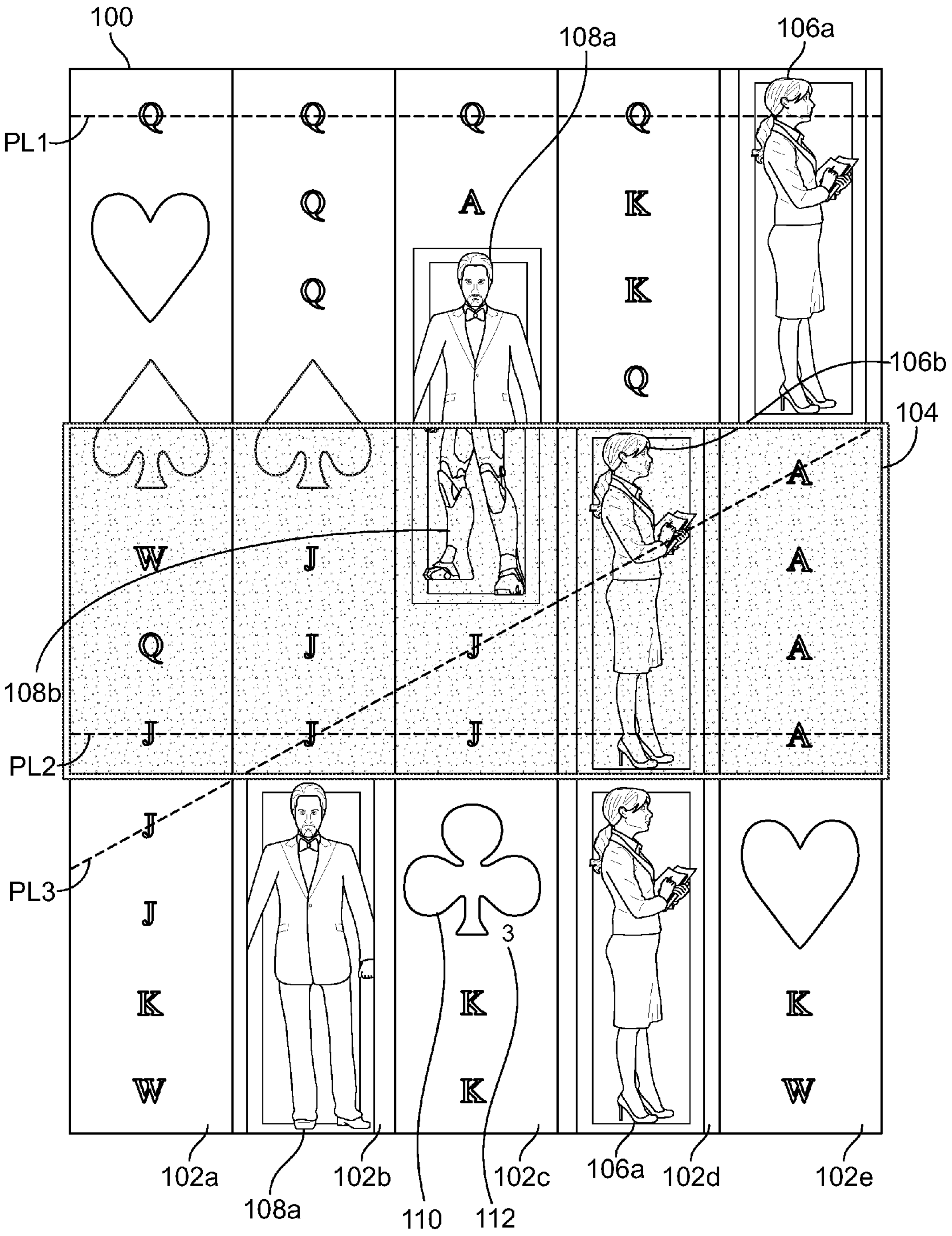
FIG. 5 is the symbol array of FIG. 4 displaying another instance of the wagering game.

Referring now to FIG. 5, the symbol array 100 with the plurality of reels 102*a*-102*e* and a symbol-alteration region 104 is again shown. The reels 102*a*-102*e* include a club special symbol 110. In FIG. 5, the female special symbols 106 have variable functions and the male special symbols 108 have at least two depictions. These functions and depictions are altered (as described in connection with FIG. 4). During this instance of the wagering game, the first functional state 106*a* of the female special symbols 106 awards ten free spins and the second functional state 106*b* awards a progressive jackpot. It is contemplated that the second functional state 106*b* may either replace the first functional state 106*a* or be applied cumulatively with the first functional state 106*a*. Thus, a player awarded the progressive jackpot would not be awarded the ten free spins if the second functional state 106*b* replaced the first functional state 106*a*.

The club special symbol 110 includes a depiction having a watermark 112 of "3." The watermark 112 is incrementally increased each time the club special symbol 110 passes from the unaltered portion of the symbol array 100 to the subset occupied by the symbol-alteration region 104. The "3" watermark 112 indicates that club special symbols 110 on the various reels 102*a*-102*e* have passed through the symbol-alteration region 104 three times during the spinning of the reels 102*a*-102*e*. As such, a second function is applied to the club special symbol 110 based on the number of times club special symbols 110 have passed through the symbol-alteration region 104 and, by extension, the watermark 112. For example, a player may be awarded one free spin for the club special symbol 110 passing through the symbol-alteration region 104 twice, two free spins for the club special symbol 110 passing through the symbol-alteration region 104 three times, five free spins for the club special symbol 110 passing through the symbol-alteration region 104 four times, etc. It is contemplated that other depictions or indications may be used and that the second functions awarded may be of differing types. For example, the watermark 112 could indicate a win-multiplier enhancement or credit-award enhancement that is increased when the club special symbol 110 passes through the symbol-alteration region 104. It is also contemplated that the depiction of the symbol-alteration region 104 may be altered instead of, or in addition to, altering the depiction of the club special symbol 110 to indicate the alternative function. One example of this would be to alter the color of the symbol-alteration region 104 such that a grey-shaded symbol-alteration region 104 indicates the club special symbol 110 has not passed through, a red-shaded symbol-alteration region 104 indicates the club special symbol 110 has passed through one time, a blue-shaded symbol-alteration region 104 indicates the club special symbol 110 has passed through two times, and a green-shaded symbol-alteration region 104 indicates the club special symbol 110 has passed through three times.

While the wagering game would typically have eighty paylines (or more) for evaluating the outcome, only three paylines PL01-PL03 are shown on the symbol array 100 for the purpose of brevity. Each of the three paylines PL01-PL03 indicates a winning combination of symbols. As can be seen, each symbol position of the first payline PL01 is not within the symbol-alteration region 104. Each symbol position of the second payline PL02 is included entirely within the symbol-alteration region 104. And, the third payline PL03 includes both symbol positions within the symbol-alteration region 104 and symbol positions outside of the symbol-alteration region 104. Hence, the various functionalities of the female and the male special symbols 106, 108 may be used depending on the functionality that is preset on the winning paylines.

Figure 6:
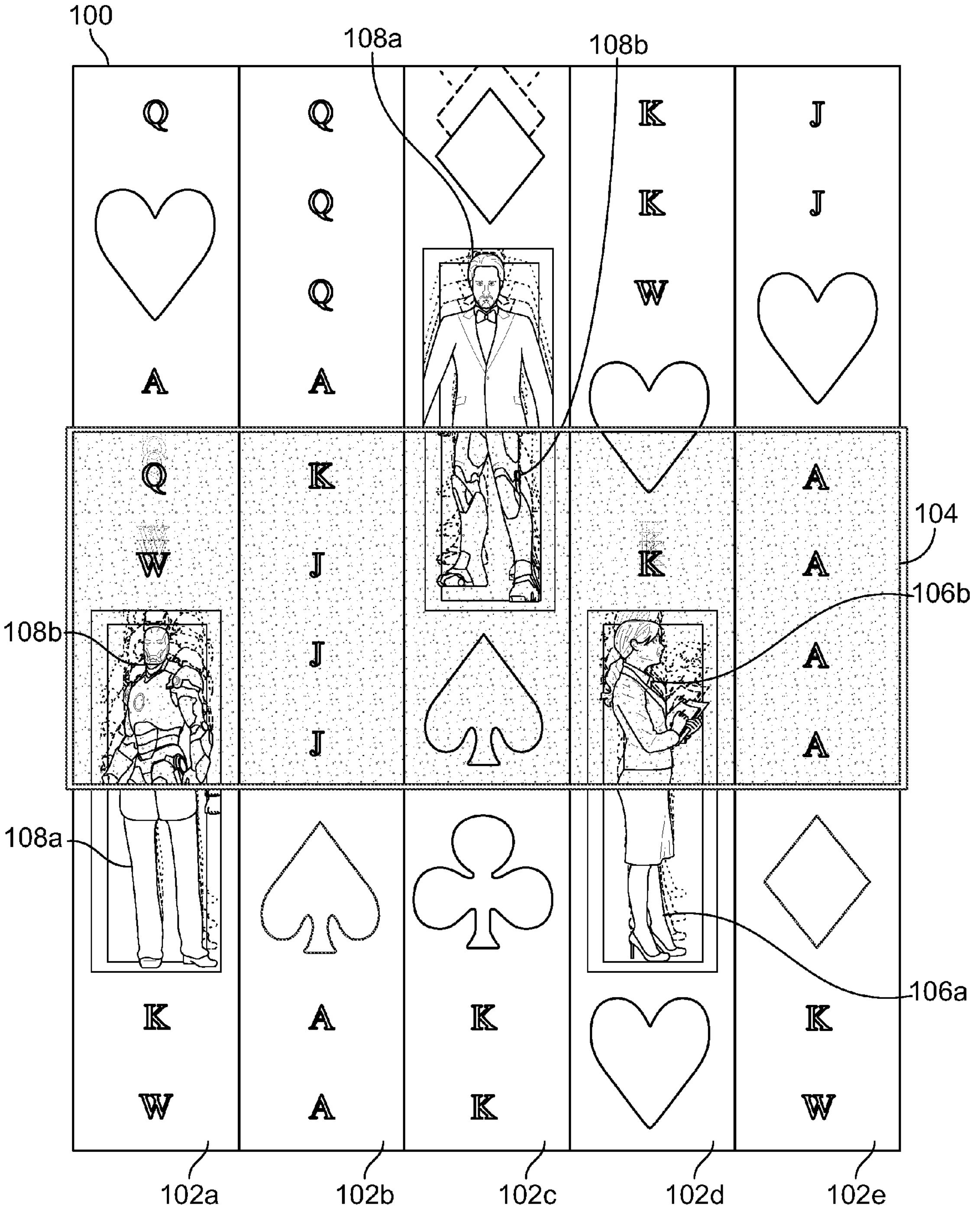
FIG. 6 illustrates the symbol array of FIG. 4 while the reels are in motion.

FIG. 6 illustrates the reels 102*a*-102*e* in motion. As can be seen, the male special symbol 108 is altered from the first depiction state 108*a* to the second depiction state 108*b* as it passes between a first portion of the symbol array 100 outside of the symbol-alteration region 104 and a second portion within the symbol-alteration region 104. The first male special symbol 108 on the leftmost reel 102*a* is continuously altered from the second depiction state 108*b* to the first depiction state 108*a* as it passes from within the symbol-alteration region 104 to outside of the symbol-alteration region 104 such that any portion of the first male special symbol 108 within the symbol-alteration region 104 is displayed in the second depiction state 108*b* and any portion of the first male special symbol 108 outside the symbol-alteration region 104 is displayed in the first depiction state 108*a*. Similarly, the second male special symbol 108 on the middle reel 102*c* is continuously altered from the first depiction state 108*a* to the second depiction state 108*b* as it moves into the symbol-alteration region 104 such that any portion of the second male special symbol 108 outside of the symbol-alteration region is displayed in the first depiction state 108*a* and any portion within the symbol-alteration region 104 is displayed in the second depiction state 108*b*.

It is contemplated that the display of the entire special symbol may be altered from the first depiction state 108*a* to the second depiction state 108*b* at once when the symbol has fully entered the symbol-alteration region 104, or when only a portion has entered the region.

Figure 7:
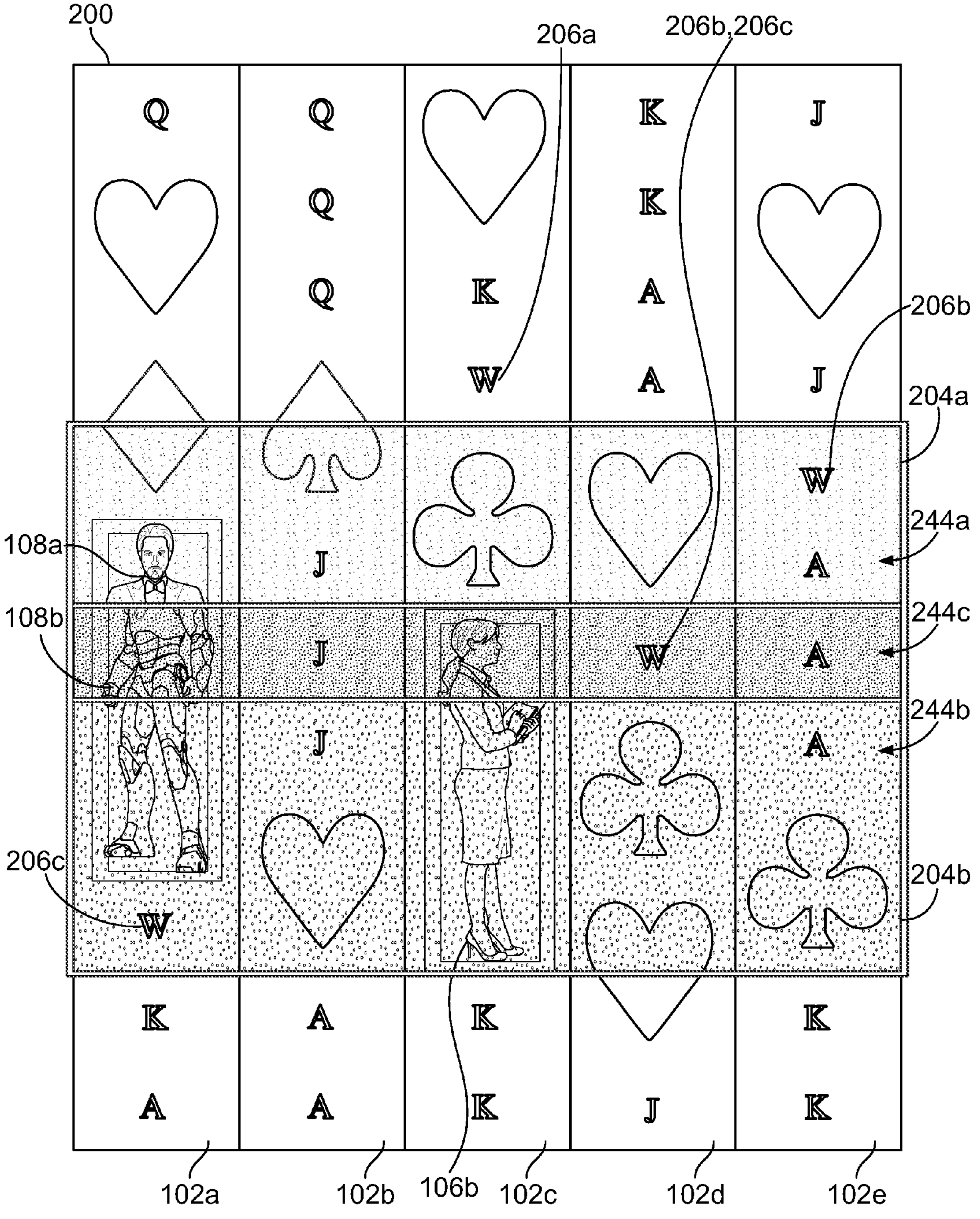
FIG. 7 is a symbol array having two symbol-alteration regions.

Referring now to FIG. 7, a symbol array 200 has two symbol-alteration regions 204*a*, 204*b*. The symbol array 200 can be a subsequent play of the wagering game described in FIGS. 4-6, or may be an independent wagering game. In the illustrated embodiment, the first symbol-alteration region 204*a* is three symbol positions high and shown as a shaded area overlying a first subset of the symbol array 200. The second symbol-alteration region 204*b* is four symbol positions high and shown as a differently shaded area overlying a second subset of the symbol array 200. The first area 244*a* on the display 12 (FIG. 1) includes symbol positions that are part of the first symbol-alteration region 204*a*, but not part of the second symbol-alteration region 204*b*. The second area 244*b* on the display 12 (FIG. 1) includes symbol positions that are part of the second symbol-alteration region 204*b*, but not part of the first symbol-alteration region 204*a*. The third area 244*c* on the display 12 (FIG. 1) includes symbol positions that are a part of both the first and the second symbol-alteration regions 204*a*, 204*b*. It is contemplated that the first and the second symbol-alteration regions 204*a*, 204*b* may not share any symbol positions. As described below, each symbol-alteration region 204*a*, 204*b* may change the function and/or depiction of the special symbols in different ways.

The female special symbol 106 has the first functional state 106*a* and the second functional state 106*b*. All female special symbols 106 have a first functional state 106*a* when outside the symbol-alteration regions 204*a*, 204*b*. The first symbol-alteration region 204*a* does not alter the functionality of the female special symbol 106. Only the second symbol-alteration region 204*b* alters the female special symbol 106 to include the second functional state 106*b*. For example, the first functional state 106*a* (which is independent of the first and the second symbol-alteration regions 204*a*, 204*b*) may award the free-spins enhancement and the second functional state 106*b* may award the scatter-pay enhancement feature. Thus, the female special symbol 106 on the middle reel 102*c* would provide two enhancements. The first enhancement awards a number of free spins because the female special symbol 106 is displayed on the symbol array 200. The illustrated female special symbol 106 further enhances the outcome by awarding scatter pays for all two-high symbols because the female special symbol 106 has stopped entirely within the second symbol-alteration region 204*b*. The fact that the female special symbol 106 is partially within the first symbol-alteration region 204*a* does not affect the game outcome because the first symbol-alteration region 204*a* does not alter the female special symbol 106.

The wild special symbol 206 has a first functional state 206*a*, a second functional state 206*b*, and a third functional state 206*c*. The wild special symbol 206 is evaluated as a typical "wild" symbol when in the first functional state 206*a*. The second functional state 206*b* of the wild special symbol 206 awards a 3× multiplier to any winning payline that includes that particular wild special symbol 206. The third functional state 206*c* of the wild special symbol 206 awards the player three beneficial reel nudges. All wild special symbols 206 include the first functional state 206*a*. The wild special symbol 206 is altered to include the second functional state 206*b* when the wild special symbol 206 is within the first symbol-alteration region 204*a*. The wild special symbol 206 is altered to include the third functional state 206*c* when the wild special symbol 206 is within the second symbol-alteration region 204*b*.

Four wild special symbols 206 are displayed on the symbol array 200 in FIG. 7. The first wild special symbol 206 is located on the middle reel 102*c* and is outside of the first and the second symbol-alteration regions 204*a*, 204*b* and is, therefore, evaluated like a typical wild symbol. The second wild special symbol 206 is located on the rightmost reel 102*e* and is altered to include the second functional state 206*b* because the symbol is located within the first symbol-alteration region 204*a*. When evaluated, the second wild special symbol 206 will act as a typical wild symbol and also award a 3× multiplier to any winning payline that includes the second wild special symbol 206. The third wild special symbol 206 is on the leftmost reel 102*a* and is altered to include the third functional state 206*c* because the symbol is located within the second symbol-alteration region 204*b*. When evaluated, the third wild special symbol 206 will act as a typical wild symbol and also award the player three nudges. The fourth wild special symbol 206 is on the fourth reel 102*d* and is altered to include the second functional state 206*b* and the third functional state 206*c* because the symbol is located with the first and the second symbol-alteration regions 204*a*, 204*b*. When evaluated, the fourth wild special symbol will act as a typical wild symbol and also award the 3× multiplier to any winning payline that includes the fourth wild special symbol 206 and award the player three additional nudges.

The male special symbol 108 includes a first depiction state 108*a* and a second depiction state 108*b*. The male special symbol 108 also includes a functionality that is altered by the second symbol-alteration region 204*b*. The second depiction state 108*b* indicates that the functionality of the male special symbol 108 includes a second functional state in addition to the first functional state. For example, the first functional state of the male special symbol 108 includes the reel-nudge enhancement and the second functional state includes the symbol-replacement enhancement. The top symbol position of the male special symbol 108 is displayed in the first depiction state 108*a* and the bottom three symbol positions are displayed in the second symbol depiction 108*b*. The male special symbol also enhances the game outcome when evaluated by awarding one reel nudge and by replacing the "A," "K," "Q," and "J," symbols on the symbol array 200 with a combination of the "SPADE," "HEART," "DIAMOND," and "CLUB" symbols.

Figure 8:
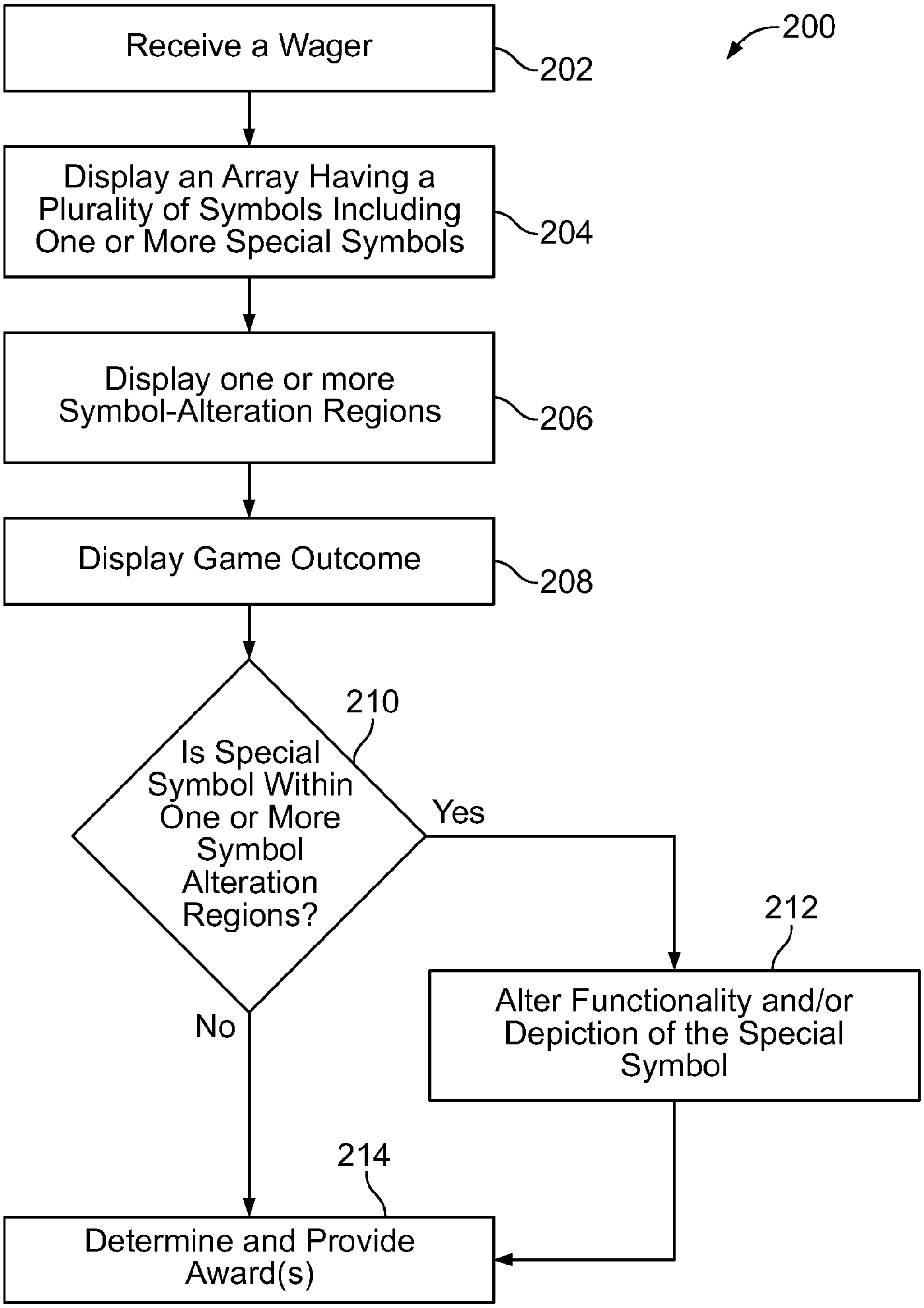
FIG. 8 is a flowchart for an algorithm that corresponds to instructions executed by a controller in accord with at least some aspects of the disclosed concepts.

FIG. 8, described by way of example above, represents one algorithm that corresponds to at least some instructions executed by the CPU 30 in FIG. 2 to perform the above described functions associated with the disclosed concepts. By way of non-limiting example, the exemplary algorithm 200 includes receiving a wager, at step 202, from a player to initiate a wagering game. The wager is placed or otherwise confirmed, for example, using a bill validator 22, coin acceptor, information reader 24, or other input device. An array having a plurality of symbols including one or more special symbols is displayed at step 204 (e.g., the symbol array 100 with symbol-bearing reels 102*a*-102*e* having special symbols, such as the female special symbol 106).

At step 206, one or more symbol-alteration regions are displayed (e.g., the symbol-alteration region 104 of FIG. 4 overlying the reels 102). After receiving the wager from the player, a game outcome is displayed. In the illustrated embodiment, the array includes a plurality of symbol-bearing reels that are spun and evaluated at step 208 (e.g., the reels 102*a*-102*e* of FIGS. 4-7). It is determined, at decision box 210, whether a special symbol is within the one or more symbol-alteration regions (e.g. the female special symbols 106 and male special symbols 108 of FIG. 4). In determining whether a special symbol is within the one or more symbol-alteration regions, the system could require the special symbol to be fully disposed within the symbol-alteration region or just partially disposed within the symbol-alteration region. If no special symbol has fallen within the symbol-alteration region, the game proceeds to step 214. If the special symbol does fall within the symbol-alteration regions, a functionality of the special symbol and/or a depiction of the special symbol is altered (e.g. the altered functionality of the second female special symbol 106 and the altered depiction of the second male special symbol 108 of FIG. 4). After the depiction and/or functionality have been altered, the deter mining awards step 214 is performed.

At step 214, it is determined what awards, if any, should be awarded. These awards are based on, for example, combinations of symbols displayed on the array, types of symbols displayed, positions of symbols displayed, etc. The player is then provided with the awards and play of the wagering game continues. In some embodiments, the depiction of a special symbol can be altered during the spinning of the reels or altered after the spinning concludes.

It is contemplated that the symbol-alteration region 104, 204 may provide a secondary feature based on the amount of the special symbol that falls within the symbol-alteration region. For example, a four-position-high special symbol may award one free spin for one position stopping within the symbol-alteration region, two free spins for two positions stopping within the symbol-alteration region, ten free spins for three positions stopping within the symbol-alteration region, and fifty free spins for all four positions stopping within the symbol-alteration region. Additionally, the secondary features may be of different types. For example, the four-position-high special symbol may award one free spin for one position stopping within the symbol-alteration region, two free spins for two positions stopping within the symbol-alteration region, a 10× multiplier—applied to any winning paylines that the special symbol lies on—for three positions stopping within the symbol-alteration region, and a progressive jackpot for all four positions stopping within the symbol-alteration region.

In addition to the height of the symbol-alteration region 104, 204 or regions being changed (e.g. FIG. 7), the width of the symbol-alteration region 104, 204 may be changed as well. Additionally, characteristics of the symbol-alteration region 104, 204 such as height, width, position, and/or the alteration provided can be changed between each spin and/or between subsequent plays of the wagering game. For example, the symbol-alteration region 104, 204 may alter the function of a special symbol to include an award of ten free spins during one play of the wagering game and may alter the function to include a 10× multiplier during a subsequent play of the wagering game.

While the symbol-alteration region 104, 204 has been illustrated as generally rectangular, it is contemplated that other shapes may be used. Additionally, it is contemplated that the height of one or more columns of the symbol-alteration region 104, 204 can be different from another. For example, the symbol-alteration region 104, 204 could overlie three positions on the first reel 102*a*, four positions on the second reel 102*b*, three positions on the third reel 102*c*, two positions on the fourth reel 102*d*, and three positions on the fifth reel 102*e*. Similarly, the width of one or more rows of the symbol-alteration region 104, 204 can be different from another. For example, the first row could overlie all five reels 102*a*-102*e*, the second row of the symbol-alteration region 104, 204 could overlie the four rightmost reels 102*b*-102*e*, and the third row of the symbol-alteration region 104, 204 could overlie the four leftmost reels 102*a*-102*d*.

It is also contemplated that the symbol-alteration region 104, 204 may only affect a special symbol in response to the occurrence of a certain trigger. This selective alteration may be indicated to the player through an alteration of the depiction of the symbol-alteration region 104, 204. For example, the symbol-alteration region 104, 204 will alter only the male special symbol 108 when the symbol-alteration region 104, 204 is shaded red, alter only the female special symbol 106 when the symbol-alteration region 104, 204 is shaded blue, and alter only the club special symbol when the symbol-alteration region 104, 204 is shaded green. The color of the symbol-alteration region 104, 204 can be varied before the reels begin spinning, or may be varied during spinning of the reels.

It is further contemplated that the symbol-alteration region 104, 204 may be removed for certain instances of the wagering game. For example, the symbol-alteration region 104, 204 may be present for a base game, but removed for a bonus game triggered during play of the base game.

Additionally, during certain instances of the wagering game, the symbol-alteration region 104, 204 may alter a special symbol from a first state to a second state with the special symbol remaining in the second state until the occurrence of some event. This can occur, for example, during a base game or a bonus game. As the plurality of reels spin through the array, a special symbol is altered from a first depiction state to a second depiction state. The special symbol then remains in the second depiction state until the conclusion of the instance (e.g. until the end of a free-spin bonus game). It is contemplated that the alteration of the depiction can occur through additive iterations. For example, the special symbol can have a first portion altered from the first state to the second state on a first pass through the symbol-alteration region 104, 204, a second portion altered from the first state to the second state on a second pass through the symbol-alteration region 104, 204, etc. Additionally or alternatively, the special symbol's function may be altered until the conclusion of the free-spin bonus game.

The symbol-alteration region 104, 204 may include the display of symbol indicia. The symbol indicia indicate certain symbols or types of symbol that trigger an enhancement feature. The trigger can occur, for example, by the indicated symbols or types of symbol passing through the indicia. Additionally, the feature or additional features may be triggered by the indicated symbol or type of symbol stopping within the indicia or the symbol-alteration region 104, 204.

The symbol-alteration region 104, 204 may additionally act as a counter for the number of times a certain symbol or symbols pass through the symbol-alteration region 104, 204. For example, during a bonus game, the player may be given an opportunity to select a special symbol and a reel. If the player selects one symbol and the fourth reel, the symbol-alteration region 104, 204 counts the number of times the fourth reel has passed the selected symbol through the symbol-alteration region 104, 204. This can be implemented, for example, during a base game or a free-spin bonus game. The player can be given an award at the conclusion of the bonus game based on the number of times the selected symbol on reel four has passed through the symbol-alteration region 104, 204. In yet another example, an award is given to the player based on the selected symbol passing through the symbol-alteration region 104, 204 more times on reel four than on any other reel.

It is yet further contemplated that the symbol-alteration region 104, 204 may change in size in response to an occurrence during an instance of the wagering game. For example, during a base game or a bonus game, the subset of the symbol array occupied by the symbol-alteration region 104, 204 increases each time a special symbol passes through the symbol-alteration region 104, 204. The size increases, or indeed the game itself, may continue until the occurrence of a predetermined event such as achieving a certain number of spins or a terminator symbol passing through the symbol-alteration region 104, 204. For example, a free-spin bonus game may continue until the terminator symbol stops within the symbol-alteration region 104, 204.

Alternatively, the symbol-alteration region 104, 204 itself may include a first functional state and a second functional state. The symbol-alteration region 104, 204 is altered from the first functional state to the second functional state by the occurrence of an event. The event can include, for example, a special symbol passing through the symbol-alteration region 104, 204, a special symbol stopping within the symbol-alteration region 104, 204, or the occurrence of a special symbol anywhere on the symbol array. It is contemplated that the symbol-alteration region 104, 204 may have more than two functional states. By way of non-limiting example, during a free-spin bonus game, the second functional state of the symbol-alteration region 104, 204 awards a win-multiplying enhancement for every winning payline within the symbol-alteration region 104, 204. This win-multiplying enhancement is incremented every time a "W" symbol passes through the symbol-alteration region 104, 204. That is, one "W" symbol passed through the symbol-alteration region 104, 204 awards a 1× multiplier, two "W" symbols passed through the symbol-alteration region 104, 204 awards a "2×" multiplier, etc.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

What is claimed is:

1. A gaming system comprising:

one or more input devices;

one or more display devices;

one or more processors; and one or more memory devices storing instructions that, when executed by at least one of the one or more processors, cause the gaming system to:

receive, via at least one of the one or more input devices, an input indicative of a wager;

display, on at least one of the one or more display devices, a plurality of reels defining a symbol array, the plurality of reels including a plurality of symbols moving through the symbol array, the plurality of symbols including a special symbol having a first function for evaluating a game outcome;

display, on at least one of the one or more display devices, a symbol-alteration region including at least two symbol positions and extending through a subset of the symbol array at a predefined position such that at least some of the plurality of symbols move between a first position outside the symbol-alteration region and a second position within the symbol-alteration region; and in response to the special symbol stopping within the symbol-alteration region, alter a functionality of the special symbol to include a second function for evaluating the game outcome.

2. The gaming system of claim 1, wherein the special symbol includes a depiction, the depiction being altered as the special symbol transitions between the first position outside the symbol-alteration region and the second position within the symbol-alteration region.

3. The gaming system of claim 2, wherein the depiction of the special symbol includes a first state and a second state, the first state being associated with the special symbol when positioned outside of the symbol-alteration region and the second state being associated with the special symbol when positioned inside of the symbol-alteration region.

4. The gaming system of claim 1, wherein the functionality of the special symbol includes the first function and the second function for evaluating the game outcome.

5. The gaming system of claim 1, wherein the instructions further cause the gaming system to display the game outcome by use of symbols aligned along a plurality of paylines, at least one of the plurality of paylines including at least one symbol position within the symbol-alteration region and at least one symbol position outside the symbol-alteration region, the second function of the special symbol only applying when the special symbol is on the at least one payline and within the symbol-alteration region.

6. The gaming system of claim 1, wherein the symbol-alteration region includes a variable depiction and the second function is selected from a plurality of functions, and wherein the second function is indicated by one of the various depictions of the symbol-alteration region.

7. A computer-implemented method in a gaming system, the method comprising:

receiving, via at least one of one or more input devices, an input indicative of a wager;

displaying, on at least one of one or more display devices, a plurality of reels defining a symbol array, the plurality of reels including a plurality of symbols moving within the symbol array, the plurality of symbols including a special symbol having a first function for evaluating a game outcome;

displaying, on at least one of the one or more display devices, a symbol-alteration region being located at a predefined position while the plurality of symbols are moving through the symbol array, the symbol-alteration region overlying a first subset of the symbol array and including at least two symbol positions within the symbol array;

displaying, on at least one of the one or more display devices, the game outcome, the game outcome including the special symbol stopping within the symbol-alteration region; and in response to the special symbol stopping within the symbol-alteration region, altering a functionality of the special symbol to include a second function for evaluating the game outcome.

8. The computer-implemented method of claim 7, further comprising altering a depiction of the special symbol as the special symbol moves between a first position outside the symbol-alteration region and a second position within the symbol-alteration region.

9. The computer-implemented method of claim 7, wherein the functionality of the special symbol includes the first function and the second function for evaluating the game outcome.

10. The computer-implemented method of claim 7, wherein the displaying the game outcome includes displaying symbols aligned along a plurality of paylines, at least one of the plurality of paylines including at least one symbol position within the symbol-alteration region and at least one symbol position outside the symbol-alteration region, the second function of the special symbol only applying when the special symbol is on the at least one payline and within the symbol-alteration region.

11. The computer-implemented method of claim 7, wherein the special symbol includes a variable depiction and the second function is selected from a plurality of functions, and wherein the second function is indicated by one of the various depictions of the special symbol.

12. The computer-implemented method of claim 7, further comprising:

displaying, on at least one of the one or more display devices, a second symbol-alteration region overlying a second subset of the symbol array; and in response to the special symbol stopping within the second symbol-alteration region, altering the functionality of the special symbol to include a third function for evaluating the game outcome.

13. The computer-implemented method of claim 12, wherein the first subset of the symbol array includes no symbol positions that are a part of the second subset of the symbol array.

14. The computer-implemented method of claim 12, wherein the first subset of the symbol array is displayed during a first play of a wagering game and the second subset of the symbol array is displayed during a second play of the wagering game, the first subset occupying a first number of symbol positions and the second subset occupying a second number of symbol positions.

15. A gaming system comprising:

one or more input devices;

one or more display devices;

one or more processors;

one or more memory devices storing instructions that, when executed by at least one of the one or more processors, cause the gaming system to:

receive, via at least one of the one or more input devices, an input indicative of a wager;

display, on at least one of the one or more display devices, a plurality of reels defining a symbol array, the plurality of reels including a plurality of symbols moving within the symbol array, the plurality of symbols including a special symbol having an original depiction and an altered depiction;

display, on at least one of the one or more display devices, a symbol-alteration region overlying a subset of the symbol array, the symbol-alteration region including at least two symbol positions; and in response to the special symbol moving between a first position outside the symbol-alteration region and a second position within the symbol-alteration region, alter the original depiction of the special symbol to the altered depiction.

16. The gaming system of claim 15, wherein the special symbol has a first function when located in regions of the symbol array outside of the symbol-alteration region, and wherein the instructions further cause the gaming system to, in response to the special symbol stopping within the symbol-alteration region, alter a functionality of the special symbol to a second function for evaluating the game outcome.

17. The gaming system of claim 16, wherein the special symbol occupies at least two symbol positions within the symbol array, and wherein the functionality is altered in response to each of the symbol positions of the special symbol stopping within the symbol-alteration region.

18. The gaming system of claim 15, wherein the instructions further cause the gaming system to, in response to the special symbol moving from within the symbol-alteration region to a position outside the symbol-alteration region, return the altered depiction to the original depiction for the special symbol.

19. The gaming system of claim 15, wherein the instructions further cause the gaming system to, in response to each move between the first position and the second position, alter the special symbol to a different altered depiction from a plurality of altered depictions, and wherein the special symbol includes a functionality based on the particular altered depiction that is displayed.

20. The gaming system of claim 15, wherein a first portion of the special symbol is located within the symbol-alteration region and a second portion of the special symbol is located outside the symbol-alteration region such that the first portion displays the altered depiction and the second portion displays the original depiction.

21. The gaming system of claim 15, wherein the instructions further cause the gaming system to trigger an event, the event being determined by a number of times the special symbol has moved between the first position and the second position.

22. A computer-implemented method in a gaming system, the method comprising:

receiving, via at least one of one or more input devices, an input indicative of a wager;

displaying, on at least one of one or more display devices, a plurality of reels defining a symbol array, the plurality of reels including a plurality of symbols, the plurality of symbols including a special symbol having an original depiction and an altered depiction;

displaying, on at least one of the one or more display devices, a symbol-alteration region extending through a subset of the symbol array, the symbol-alteration region including at least two symbol positions;

moving the plurality of symbols through the symbol array such that the special symbol moves between a first position outside the symbol-alteration region and a second position within the symbol-alteration region; and in response to the special symbol moving between the first position and the second position, altering, via at least one of one or more processors, the original depiction of the special symbol to the altered depiction.

23. The computer-implemented method of claim 22, further comprising, in response to the special symbol stopping within the symbol-alteration region, altering a functionality of the special symbol to include a first function for evaluating the game outcome.

24. The computer-implemented method of claim 22, further comprising triggering an event, the event being determined by a number of times the special symbol has moved between the first position and the second position.

25. The computer-implemented method of claim 22, wherein a first portion of the special symbol is located within the symbol-alteration region and a second portion of the special symbol is located outside the symbol-alteration region such that the first portion displays the altered depiction and the second portion displays the original depiction.

26. One or more non-transitory, physical machine-readable storage media including instructions which, when executed by one or more processors, cause the one or more processors to perform operations comprising:

receive, via at least one of the one or more input devices, an input indicative of a wager;

display, on at least one of the one or more display devices, a plurality of reels defining a symbol array, the plurality of reels including a plurality of symbols moving through the symbol array, the plurality of symbols including a special symbol having a first function for evaluating a game outcome;

display, on at least one of the one or more display devices, a symbol-alteration region including at least two symbol positions and extending through a subset of the symbol array at a predefined position such that at least some of the plurality of symbols move between a first position outside the symbol-alteration region and a second position within the symbol-alteration region; and in response to the special symbol stopping within the symbol-alteration region, alter a functionality of the special symbol to include a second function for evaluating the game outcome.

27. The one or more non-transitory, physical machine-readable storage media of claim 26, wherein the special symbol includes a depiction, the depiction being altered as the special symbol transitions between a first position within the symbol-alteration region and a second position outside the symbol-alteration region.

28. The one or more non-transitory, physical machine-readable storage media of claim 26, wherein the functionality of the special symbol includes the first function and the second function for evaluating the game outcome.

* * * * *